June 2, 1925.
B. ALTMAN ET AL
1,540,300
CARRIER FOR DENTAL FLASKS
Filed July 30, 1923
FIG. I.
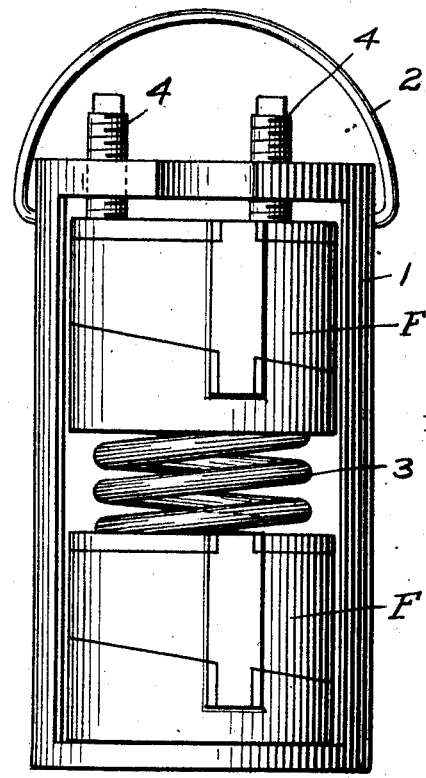
FIG. II.
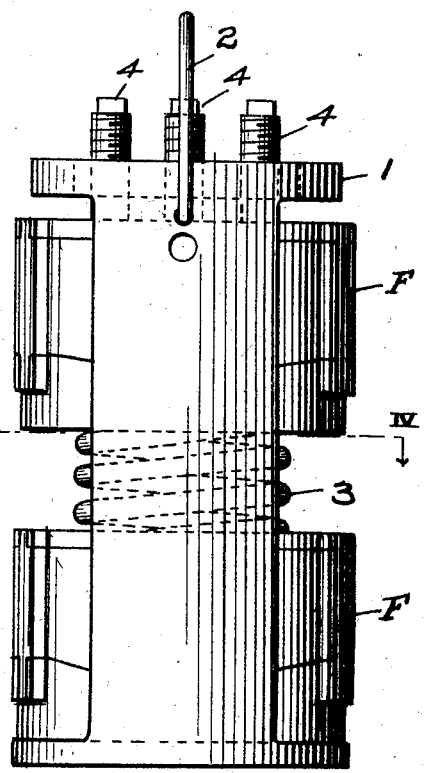
FIG. III.
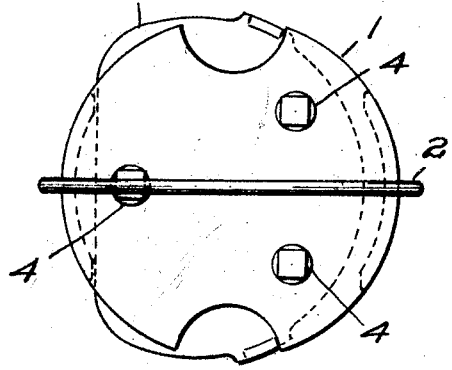
FIG. IV.
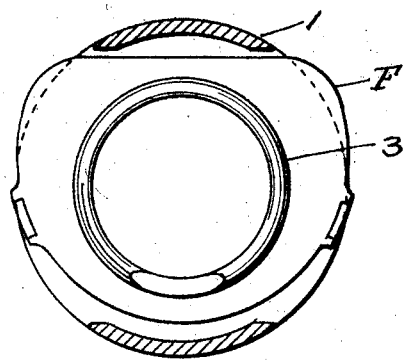
WITNESSES
J. Herbert Bradley
Percy A. English
INVENTOR
Bernard Altman
Archie M. Fulton
Harold B. Breese
by Christy and Christy
their attorneys Patented June 2, 1925.

1,540,300

UNITED STATES PATENT OFFICE.

BERNARD ALTMAN, OF PITTSBURGH, ARCHIE M. FULTON, OF NEW CASTLE, AND HAROLD C. BREESE, OF PITTSBURGH, PENNSYLVANIA.

CARRIER FOR DENTAL FLASKS.

Application filed July 30, 1923. Serial No. 654,555.

*To all whom it may concern:*

Be it known that we, BERNARD ALTMAN, residing at Pittsburgh, in the county of Allegheny and State of Pennsylvania, ARCHIE M. FULTON, residing at New Castle, Lawrence County, Pennsylvania, and HAROLD C. BREESE, residing at Pittsburgh, in the county of Allegheny and State of Pennsylvania, citizens of the United States, have invented or discovered certain new and useful Improvements in Carriers for Dental Flasks, of which improvements the following is a specification.

Our invention relates to holders for flasks used in the molding and curing of particular articles, and while not necessarily limited to the production of any particular articles nor to articles of any particular material, we shall describe it in its application to the production of dental plates out of vulcanite, or out of a material of which rubber is a dominant ingredient.

Such an article is formed by preparing the material in plastic condition and forming it within a mold. While newly formed within the mold the article is vulcanized, that is to say its constituent material is converted from a plastic to a solid. In vulcanization the material tends to swell somewhat.

In the accompanying drawings Figs. I and II are views in front and side elevation of a holder embodying our invention, and carrying flasks in normal manner. Fig. III is a plan view from above of the same assembly, and Fig. IV is a view in horizontal section, on the plane indicated by the line IV—IV, Fig. II.

The carrier consists of a body 1 which is essentially a hollow cylinder. The heads of the cylinder are intact, or substantially so (cf. Fig. III), but the walls of the cylinder are cut away sufficiently to allow for the application and removal of the flasks (cf. Figs. I, II, and IV). The heads and walls of the cylinder are formed integrally, and preferably as a single casting of suitable material, bronze, for example. The wall thickness is sufficient to afford the desired strength, three eighths of an inch, more or less, for a structure of such size as the drawings indicate. This body 1 may be provided with a bail 2, for convenience in handling.

Within the hollow cylindrical body the flasks are carried and sustained during the operation of vulcanization. The number of flasks to be borne in a single carrier is not inflexible. We show in the drawings a carrier proportioned and intended for two flasks, but it might have been built for one or for three or more.

The flasks, of which in this instance there are two, are indicated at F. They are of columnar form, in cross section revealing the shape of a dental plate. Their side walls are straight and their opposite heads plane surfaces, and parallel. They are assembled within the crrier as shown, in superposed position, their heads extending in parallelism the side walls in continuous lines, or substantially so. The flasks are formed in a plurality of parts which meet in transverse and approximately horizontal planes. It will be understood that within the flasks are the molds filled with plastic. It is to be remarked particularly of these flasks that their parts are not bolted together, each flask by itself, as is usual.

With the flasks and within the carrier is assembled under compression a spring 3, and this spring is one of considerable strength, and is of such size and is so shaped and disposed that it bears upon and exerts its strength over large areas of the flask heads.

Through one of the heads of the carrier extend three adjustable screws 4. In the assembly these bear upon one head of a flask while the spring which is assembled with the flask within the carrier exerts its tension to drive the flask firmly against the ends of the screws 4. (A follower plate might of course be interposed.) The screws are adjustable on lines perpendicular to the head through which they extend, that is to say parallel with the axis of the cylindrical carrier.

Comparison of Figs. I, II and III will show the preferred arrangement of these screws, equidistant from the axis of the cylindrical carrier and equidistant one from another or approximately so.

Three fixed points define a plane. A flask spring-backed and held yieldingly against these three screws cannot tip. Adjustment of the screws will afford minute definition of the position of the flask which bears upon them. By extension and retraction variations in flask thickness are amply provided for.

The flasks within which the material in plastic condition has been molded and enclosed are assembled within the carrier, and the screws 4 properly adjusted. Vulcanization follows. Incident to vulcanization some swelling of the material occurs. This swelling cannot effect tipping of the mold because it is sustained between a stiff spring exerting its tension on one side over a wide area and a virtually fixed plane on the other.

Comparison of the figures will show that the distance at which the screws are set from the axis of the cylindrical casing is substantially equal to the radius of the helix to which spring 3 is coiled, and that in assembly the spring is arranged coaxially within the carrier. This radius furthermore is approximately half the value of the greatest radius of the columnar flasks F. Consideration of these things makes it manifest that under the strain of swelling within, the halves of the flasks will not gape on one side, but will spread evenly. In consequence the article formed and vulcanized within may be kept true, and a closely fitting article assured.

We have already alluded to the fact that the usual bolts for uniting the flask parts are dispensed with. The assembly constitutes a firmly secured unit. This is a matter of simplification. And with this simplification is the further feature, that allowance is made for the expansion of the material under vulcanization, and this without distortion.

We claim as our invention:

A flask carrier consisting of an integral substantially cylindrical hollow casing, its side walls cut away for the insertion and removal of flasks and provided with three set screws adjustable in one head and extending through the head on lines parallel with its axis, the said screws being spaced at equal distances from the axis of the carrier, and a helical spring whose helical radius equals the distance last noted at which the screws stand remote from the axis of the flask and applicable in assembly with a flask to coaxial position within the carrier.

In testimony whereof we have hereunto set our hands.

BERNARD ALTMAN.
ARCHIE M. FULTON.
HAROLD C. BREESE.

Witnesses:
PERCY A. ENGLISH,
DORA HONLY,
J. WINDT.